(12) United States Patent
Michels et al.

(10) Patent No.: US 9,244,843 B1
(45) Date of Patent: Jan. 26, 2016

(54) METHODS FOR IMPROVING FLOW CACHE BANDWIDTH UTILIZATION AND DEVICES THEREOF

(71) Applicant: F5 Networks, Inc., Seattle, WA (US)

(72) Inventors: Timothy S. Michels, Greenacres, WA (US); C Stuart Johnson, Liberty Lake, WA (US)

(73) Assignee: F5 Networks, Inc., Seattle, WA (US)

( * ) Notice: Subject to any disclaimer, the term of this patent is extended or adjusted under 35 U.S.C. 154(b) by 493 days.

(21) Appl. No.: 13/771,538

(22) Filed: Feb. 20, 2013

Related U.S. Application Data

(60) Provisional application No. 61/600,954, filed on Feb. 20, 2012.

(51) Int. Cl.
*G06F 12/08* (2006.01)
*H04L 1/00* (2006.01)

(52) U.S. Cl.
CPC ............. *G06F 12/0817* (2013.01); *H04L 1/00* (2013.01); *H04L 2201/00* (2013.01)

(58) Field of Classification Search
CPC ....... G06F 12/0817; G06F 12/08; H04L 1/00; H04L 2201/00
See application file for complete search history.

(56) References Cited

U.S. PATENT DOCUMENTS

| | | | |
|---|---|---|---|
| 5,282,201 A | 1/1994 | Frank et al. |
| 5,550,816 A | 8/1996 | Hardwick et al. |
| 5,606,665 A | 2/1997 | Yang et al. |
| 5,623,490 A | 4/1997 | Richter et al. |
| 5,991,302 A | 11/1999 | Berl et al. |
| 5,995,491 A | 11/1999 | Richter et al. |
| 6,026,500 A | 2/2000 | Topff et al. |
| 6,029,175 A | 2/2000 | Chow et al. |
| 6,041,365 A | 3/2000 | Kleinerman |
| 6,047,356 A | 4/2000 | Anderson et al. |

(Continued)

FOREIGN PATENT DOCUMENTS

| | | |
|---|---|---|
| CA | 2080530 A1 | 4/1994 |
| EP | 0605088 A3 | 2/1996 |

(Continued)

OTHER PUBLICATIONS

Baer, T., et al., "The elements of Web services" ADTmag.com, Dec. 1, 2002, pp. 1-6, (http://www.adtmag.com).

(Continued)

*Primary Examiner* — Edward Dudek, Jr.
*Assistant Examiner* — Christopher D Birkhimer
(74) *Attorney, Agent, or Firm* — LeClairRyan, a Profession Corporation

(57) ABSTRACT

A network traffic management apparatus includes a first memory including a flow cache table including a plurality of entries. The network traffic management apparatus further includes configurable hardware logic coupled to the first memory and a processor, the configurable hardware logic including a valid split table including a plurality of entries, wherein each of the plurality of entries includes a validity bit. The configurable hardware logic is configured to implement periodically determining whether the validity bit of each of the valid split table entries is set. Additionally, the configurable hardware logic is further configured to implement retrieving one of the plurality of flow cache table entries corresponding to an index value associated with one of the valid split table entries, when it is determined that the validity bit of the one of the valid split table entries is set.

17 Claims, 8 Drawing Sheets

(56) References Cited

U.S. PATENT DOCUMENTS

| | | |
|---|---|---|
| 6,067,558 A | 5/2000 | Wendt et al. |
| 6,104,706 A | 8/2000 | Richter et al. |
| 6,154,777 A | 11/2000 | Ebrahim |
| 6,157,950 A | 12/2000 | Krishnan |
| 6,259,405 B1 | 7/2001 | Stewart et al. |
| 6,260,070 B1 | 7/2001 | Shah |
| 6,292,832 B1 | 9/2001 | Shah et al. |
| 6,304,913 B1 | 10/2001 | Rune |
| 6,330,574 B1 | 12/2001 | Murashita |
| 6,338,082 B1 | 1/2002 | Schneider |
| 6,353,848 B1 | 3/2002 | Morris |
| 6,363,056 B1 | 3/2002 | Beigi et al. |
| 6,370,527 B1 | 4/2002 | Singhal |
| 6,389,462 B1 | 5/2002 | Cohen et al. |
| 6,446,108 B1 | 9/2002 | Rosenberg et al. |
| 6,466,580 B1 | 10/2002 | Leung |
| 6,469,983 B2 | 10/2002 | Narayana et al. |
| 6,513,061 B1 | 1/2003 | Ebata et al. |
| 6,514,085 B2 | 2/2003 | Slattery et al. |
| 6,542,936 B1 | 4/2003 | Mayle et al. |
| 6,560,230 B1 | 5/2003 | Li et al. |
| 6,578,069 B1 | 6/2003 | Hopmann et al. |
| 6,615,267 B1 | 9/2003 | Whalen et al. |
| 6,654,346 B1 | 11/2003 | Mahalingaiah et al. |
| 6,701,415 B1 | 3/2004 | Hendren, III |
| 6,708,220 B1 | 3/2004 | Olin |
| 6,728,704 B2 | 4/2004 | Mao et al. |
| 6,738,357 B1 | 5/2004 | Richter et al. |
| 6,744,776 B1 | 6/2004 | Kalkunte et al. |
| 6,754,215 B1 | 6/2004 | Arikawa et al. |
| 6,754,699 B2 | 6/2004 | Swildens et al. |
| 6,760,337 B1 | 7/2004 | Snyder, II et al. |
| 6,795,860 B1 | 9/2004 | Shah |
| 6,865,593 B1 | 3/2005 | Reshef et al. |
| 6,868,447 B1 | 3/2005 | Slaughter et al. |
| 6,871,221 B1 | 3/2005 | Styles |
| 6,880,017 B1 | 4/2005 | Marce et al. |
| 6,883,137 B1 | 4/2005 | Girardot et al. |
| 6,914,881 B1 | 7/2005 | Mansfield et al. |
| 6,928,518 B2 | 8/2005 | Talagala |
| 6,970,475 B1 | 11/2005 | Fraser et al. |
| 6,970,924 B1 | 11/2005 | Chu et al. |
| 6,973,490 B1 | 12/2005 | Robertson et al. |
| 6,975,592 B1 | 12/2005 | Seddigh et al. |
| 6,990,074 B2 | 1/2006 | Wan et al. |
| 6,990,114 B1 | 1/2006 | Erimli et al. |
| 7,003,564 B2 | 2/2006 | Greuel et al. |
| 7,006,502 B2 * | 2/2006 | Lin .................. H04L 47/10 370/360 |
| 7,023,974 B1 | 4/2006 | Brannam et al. |
| 7,035,212 B1 | 4/2006 | Mittal et al. |
| 7,039,061 B2 | 5/2006 | Connor et al. |
| 7,065,482 B2 | 6/2006 | Shorey et al. |
| 7,075,924 B2 | 7/2006 | Richter et al. |
| 7,076,689 B2 | 7/2006 | Atkinson |
| 7,080,314 B1 | 7/2006 | Garofalakis et al. |
| 7,089,491 B2 | 8/2006 | Feinberg et al. |
| 7,113,996 B2 | 9/2006 | Kronenberg |
| 7,133,863 B2 | 11/2006 | Teng et al. |
| 7,161,904 B2 * | 1/2007 | Hussain ............ H04L 43/026 370/230 |
| 7,191,163 B2 | 3/2007 | Herrera et al. |
| 7,228,359 B1 | 6/2007 | Monteiro |
| 7,236,491 B2 | 6/2007 | Tsao et al. |
| 7,240,100 B1 | 7/2007 | Wein et al. |
| 7,292,541 B1 | 11/2007 | CS |
| 7,296,263 B1 | 11/2007 | Jacob |
| 7,308,475 B1 | 12/2007 | Pruitt et al. |
| 7,324,533 B1 | 1/2008 | DeLiberato et al. |
| 7,340,571 B2 | 3/2008 | Saze |
| 7,373,438 B1 | 5/2008 | DeBergalis et al. |
| 7,409,440 B1 | 8/2008 | Jacob |
| 7,555,608 B2 * | 6/2009 | Naik .................. G06F 12/0891 711/133 |
| 7,577,723 B2 | 8/2009 | Matsuda et al. |
| 7,640,347 B1 | 12/2009 | Sloat et al. |
| 7,684,423 B2 | 3/2010 | Tripathi et al. |
| 7,698,458 B1 | 4/2010 | Liu et al. |
| 7,822,839 B1 | 10/2010 | Pruitt et al. |
| 7,861,085 B1 | 12/2010 | Case et al. |
| 7,895,653 B2 | 2/2011 | Calo et al. |
| 7,903,554 B1 | 3/2011 | Manur et al. |
| 7,908,245 B2 | 3/2011 | Nakano et al. |
| 7,958,222 B1 | 6/2011 | Pruitt et al. |
| 7,984,500 B1 | 7/2011 | Khanna et al. |
| 8,024,443 B1 | 9/2011 | Jacob |
| 8,064,342 B2 | 11/2011 | Badger |
| 8,069,225 B2 | 11/2011 | McCanne et al. |
| 8,155,128 B2 | 4/2012 | Balyan et al. |
| 8,171,124 B2 | 5/2012 | Kondamuru |
| 8,190,769 B1 | 5/2012 | Shukla et al. |
| 8,396,836 B1 | 3/2013 | Ferguson et al. |
| 8,463,850 B1 | 6/2013 | McCann |
| 8,484,348 B2 | 7/2013 | Subramanian et al. |
| 8,601,000 B1 | 12/2013 | Stefani et al. |
| 2001/0007560 A1 | 7/2001 | Masuda et al. |
| 2002/0012352 A1 | 1/2002 | Hansson et al. |
| 2002/0038360 A1 | 3/2002 | Andrews et al. |
| 2002/0065848 A1 | 5/2002 | Walker et al. |
| 2002/0072048 A1 | 6/2002 | Slattery et al. |
| 2002/0087571 A1 | 7/2002 | Stapel et al. |
| 2002/0087744 A1 | 7/2002 | Kitchin |
| 2002/0099829 A1 | 7/2002 | Richards et al. |
| 2002/0099842 A1 | 7/2002 | Jennings et al. |
| 2002/0103823 A1 | 8/2002 | Jackson et al. |
| 2002/0143819 A1 | 10/2002 | Han et al. |
| 2002/0143852 A1 | 10/2002 | Guo et al. |
| 2002/0162118 A1 | 10/2002 | Levy et al. |
| 2002/0174216 A1 | 11/2002 | Shorey et al. |
| 2002/0194112 A1 | 12/2002 | DePinto et al. |
| 2002/0194342 A1 | 12/2002 | Lu et al. |
| 2002/0198956 A1 | 12/2002 | Dunshea et al. |
| 2003/0005172 A1 | 1/2003 | Chessell |
| 2003/0009528 A1 | 1/2003 | Sharif et al. |
| 2003/0018450 A1 | 1/2003 | Carley |
| 2003/0018585 A1 | 1/2003 | Butler et al. |
| 2003/0034905 A1 | 2/2003 | Anton et al. |
| 2003/0051045 A1 | 3/2003 | Connor |
| 2003/0055723 A1 | 3/2003 | English |
| 2003/0074301 A1 | 4/2003 | Solomon |
| 2003/0105846 A1 | 6/2003 | Zhao et al. |
| 2003/0108000 A1 | 6/2003 | Chaney et al. |
| 2003/0108002 A1 | 6/2003 | Chaney et al. |
| 2003/0128708 A1 | 7/2003 | Inoue et al. |
| 2003/0130945 A1 | 7/2003 | Force |
| 2003/0139934 A1 | 7/2003 | Mandera |
| 2003/0156586 A1 | 8/2003 | Lee et al. |
| 2003/0179755 A1 | 9/2003 | Fraser |
| 2003/0189936 A1 | 10/2003 | Terrell et al. |
| 2003/0191812 A1 | 10/2003 | Agarwalla et al. |
| 2003/0195813 A1 | 10/2003 | Pallister et al. |
| 2003/0212954 A1 | 11/2003 | Patrudu |
| 2003/0220835 A1 | 11/2003 | Barnes, Jr. |
| 2003/0229665 A1 | 12/2003 | Ryman |
| 2003/0236995 A1 | 12/2003 | Fretwell, Jr. |
| 2004/0006591 A1 | 1/2004 | Matsui et al. |
| 2004/0015783 A1 | 1/2004 | Lennon et al. |
| 2004/0017825 A1 | 1/2004 | Stanwood et al. |
| 2004/0030627 A1 | 2/2004 | Sedukhin |
| 2004/0030740 A1 | 2/2004 | Stelting |
| 2004/0043758 A1 | 3/2004 | Sorvari et al. |
| 2004/0059789 A1 | 3/2004 | Shum |
| 2004/0064544 A1 | 4/2004 | Barsness et al. |
| 2004/0064554 A1 | 4/2004 | Kuno et al. |
| 2004/0093361 A1 | 5/2004 | Therrien et al. |
| 2004/0122926 A1 | 6/2004 | Moore et al. |
| 2004/0123277 A1 | 6/2004 | Schrader et al. |
| 2004/0133605 A1 | 7/2004 | Chang et al. |
| 2004/0138858 A1 | 7/2004 | Carley |
| 2004/0167967 A1 | 8/2004 | Bastian et al. |
| 2004/0213156 A1 | 10/2004 | Smallwood et al. |
| 2004/0215665 A1 | 10/2004 | Edgar et al. |
| 2004/0236826 A1 | 11/2004 | Harville et al. |
| 2005/0008017 A1 | 1/2005 | Datta et al. |

(56) References Cited

U.S. PATENT DOCUMENTS

| | | |
|---|---|---|
| 2005/0021703 A1 | 1/2005 | Cherry et al. |
| 2005/0027841 A1 | 2/2005 | Rolfe |
| 2005/0044158 A1 | 2/2005 | Malik |
| 2005/0117589 A1 | 6/2005 | Douady et al. |
| 2005/0165656 A1 | 7/2005 | Frederick et al. |
| 2005/0174944 A1 | 8/2005 | Legault et al. |
| 2005/0175013 A1 | 8/2005 | Le Pennec et al. |
| 2005/0198234 A1 | 9/2005 | Leib et al. |
| 2005/0213587 A1 | 9/2005 | Cho et al. |
| 2005/0234928 A1 | 10/2005 | Shkvarchuk et al. |
| 2005/0240664 A1 | 10/2005 | Chen et al. |
| 2005/0256806 A1 | 11/2005 | Tien et al. |
| 2005/0273456 A1 | 12/2005 | Revanuru et al. |
| 2006/0031374 A1 | 2/2006 | Lu et al. |
| 2006/0031778 A1 | 2/2006 | Goodwin et al. |
| 2006/0045089 A1 | 3/2006 | Bacher et al. |
| 2006/0045096 A1 | 3/2006 | Farmer et al. |
| 2006/0047785 A1 | 3/2006 | Wang et al. |
| 2006/0100752 A1 | 5/2006 | Kim et al. |
| 2006/0112367 A1 | 5/2006 | Harris |
| 2006/0123210 A1 | 6/2006 | Pritchett et al. |
| 2006/0130133 A1 | 6/2006 | Andreev et al. |
| 2006/0133374 A1* | 6/2006 | Sekiguchi ............ H04L 49/602 370/389 |
| 2006/0140193 A1 | 6/2006 | Kakani et al. |
| 2006/0153201 A1 | 7/2006 | Hepper et al. |
| 2006/0209669 A1 | 9/2006 | Nishio |
| 2006/0235998 A1 | 10/2006 | Stechler et al. |
| 2006/0259320 A1 | 11/2006 | LaSalle et al. |
| 2006/0268692 A1 | 11/2006 | Wright et al. |
| 2006/0270341 A1 | 11/2006 | Kim et al. |
| 2006/0282442 A1 | 12/2006 | Lennon et al. |
| 2007/0005807 A1 | 1/2007 | Wong |
| 2007/0016613 A1 | 1/2007 | Foresti et al. |
| 2007/0038994 A1 | 2/2007 | Davis et al. |
| 2007/0112775 A1 | 5/2007 | Ackerman |
| 2007/0124415 A1 | 5/2007 | Lev-Ran et al. |
| 2007/0124502 A1 | 5/2007 | Li |
| 2007/0130255 A1 | 6/2007 | Wolovitz et al. |
| 2007/0147246 A1* | 6/2007 | Hurley ............... H04L 12/2602 370/232 |
| 2007/0162891 A1 | 7/2007 | Burner et al. |
| 2007/0168320 A1 | 7/2007 | Borthakur et al. |
| 2007/0192543 A1* | 8/2007 | Naik ................... H04L 47/2441 711/133 |
| 2007/0233826 A1 | 10/2007 | Tindal et al. |
| 2007/0250560 A1 | 10/2007 | Wein et al. |
| 2008/0004022 A1 | 1/2008 | Johannesson et al. |
| 2008/0010372 A1 | 1/2008 | Khedouri et al. |
| 2008/0022059 A1 | 1/2008 | Zimmerer et al. |
| 2008/0208917 A1 | 8/2008 | Smoot et al. |
| 2008/0263401 A1 | 10/2008 | Stenzel |
| 2008/0270578 A1 | 10/2008 | Zhang et al. |
| 2008/0281908 A1 | 11/2008 | McCanne et al. |
| 2009/0080440 A1 | 3/2009 | Balyan et al. |
| 2009/0094311 A1 | 4/2009 | Awadallah et al. |
| 2009/0106413 A1 | 4/2009 | Salo et al. |
| 2009/0125955 A1 | 5/2009 | DeLorme |
| 2009/0138314 A1 | 5/2009 | Bruce |
| 2009/0161542 A1 | 6/2009 | Ho |
| 2009/0187915 A1 | 7/2009 | Chew et al. |
| 2009/0217163 A1 | 8/2009 | Jaroker |
| 2009/0217386 A1 | 8/2009 | Schneider |
| 2009/0241176 A1 | 9/2009 | Beletski et al. |
| 2009/0265396 A1 | 10/2009 | Ram et al. |
| 2009/0265467 A1 | 10/2009 | Peles |
| 2009/0292957 A1 | 11/2009 | Bower et al. |
| 2009/0300161 A1 | 12/2009 | Pruitt et al. |
| 2009/0316708 A1 | 12/2009 | Yahyaoui et al. |
| 2009/0319600 A1 | 12/2009 | Sedan et al. |
| 2010/0042743 A1 | 2/2010 | Jeon et al. |
| 2010/0061232 A1 | 3/2010 | Zhou et al. |
| 2010/0064001 A1 | 3/2010 | Daily |
| 2010/0070476 A1 | 3/2010 | O'Keefe et al. |
| 2010/0093318 A1 | 4/2010 | Zhu et al. |
| 2010/0131654 A1 | 5/2010 | Malakapalli et al. |
| 2010/0179984 A1 | 7/2010 | Sebastian |
| 2010/0228819 A1 | 9/2010 | Wei |
| 2010/0242092 A1 | 9/2010 | Harris et al. |
| 2010/0250497 A1 | 9/2010 | Redlich et al. |
| 2010/0274772 A1 | 10/2010 | Samuels |
| 2010/0306169 A1 | 12/2010 | Pishevar et al. |
| 2011/0055921 A1 | 3/2011 | Narayanaswamy et al. |
| 2011/0066736 A1 | 3/2011 | Mitchell et al. |
| 2011/0072321 A1 | 3/2011 | Dhuse |
| 2011/0098087 A1 | 4/2011 | Tseng |
| 2011/0185082 A1 | 7/2011 | Thompson |
| 2012/0117028 A1 | 5/2012 | Gold et al. |
| 2012/0150805 A1 | 6/2012 | Pafumi et al. |
| 2012/0195273 A1 | 8/2012 | Iwamura et al. |
| 2012/0257506 A1* | 10/2012 | Bazlamacci ............ H04L 45/00 370/235 |
| 2012/0258766 A1 | 10/2012 | Cho et al. |
| 2013/0058229 A1 | 3/2013 | Casado et al. |
| 2013/0238472 A1 | 9/2013 | Fan et al. |
| 2014/0071895 A1 | 3/2014 | Bane et al. |
| 2014/0099945 A1 | 4/2014 | Singh et al. |
| 2014/0105069 A1 | 4/2014 | Potnuru |
| 2014/0187199 A1 | 7/2014 | Yan et al. |
| 2014/0286316 A1 | 9/2014 | Park et al. |

FOREIGN PATENT DOCUMENTS

| | | |
|---|---|---|
| EP | 1081918 A2 | 8/2000 |
| JP | 6205006 A3 | 7/1994 |
| JP | 821924 B2 | 3/1996 |
| JP | 2000183935 A3 | 6/2000 |
| WO | 0058870 | 3/2000 |
| WO | 0239696 A2 | 5/2002 |
| WO | 2006091040 A1 | 8/2006 |

OTHER PUBLICATIONS

Blue Coat, "Technology Primer: CIFS Protocol Optimization," Blue Coat Systems Inc., 2007, last accessed: Dec. 9, 2013, pp. 1-3, (http://www.bluecoat.com).

"Diameter MBLB Support Phase 2: Generic Message Based Load Balancing (GMBLB)", last accessed Mar. 29, 2010, pp. 1-10, (http://peterpan.f5net.com/twiki/bin/view/TMOS/TMOSDiameterMBLB).

F5 Networks Inc., "Big-IP® Reference Guide, version 4.5", F5 Networks Inc., Sep. 2002, pp. 11-1-11-32, Seattle, Washington.

F5 Networks Inc., "3-DNS® Reference Guide, version 4.5", F5 Networks Inc., Sep. 2002, pp. 2-1-2-28, 3-1-3-12, 5-1-5-24, Seattle, Washington.

F5 Networks Inc., "Using F5's-DNS Controller to Provide High Availability Between Two or More Data Centers", F5 Networks Inc., Aug. 2001, pp. 1-4, Seattle, Washington, (http://www.f5.com/f5products/3dns/relatedMaterials/3DNSRouting.html).

F5 Networks Inc., "Deploying the BIG-IP LTM for Diameter Traffic Management," F5® Deployment Guide, Publication date Sep. 2010, Version 1.2, pp. 1-19.

F5 Networks Inc., "F5 Diameter RM", Powerpoint document, Jul. 16, 2009, pp. 1-7.

F5 Networks Inc., "Routing Global Internet Users to the Appropriate Data Center and Applications Using F5's 3-DNS Controller", F5 Networks Inc., Aug. 2001, pp. 1-4, Seattle, Washington, (http://www.f5.com/f5producs/3dns/relatedMaterials/UsingF5.html).

F5 Networks Inc., "Case Information Log for 'Issues with BoNY upgrade to 4.3'", as early as Feb. 2008.

F5 Networks Inc., "F5 WANJet CIFS Acceleration", White Paper, F5 Networks Inc., Mar. 2006, pp. 1-5, Seattle, Washington.

Fajardo V., "Open Diameter Software Architecture," Jun. 25, 2004, pp. 1-6, Version 1.0.7.

Gupta et al., "Algorithms for Packet Classification", Computer Systems Laboratory, Stanford University, CA, Mar./Apr. 2001, pp. 1-29.

Heinz G., "Priorities in Stream Transmission Control Protocol (SCTP) Multistreaming", Thesis submitted to the Faculty of the University of Delaware, Spring 2003, pp. 1-35.

(56) References Cited

OTHER PUBLICATIONS

Ilvesjmaki M., et al., "On the capabilities of application level traffic measurements to differentiate and classify Internet traffic", Presented in SPIE's International Symposium ITcom, Aug. 19-21, 2001, pp. 1-11, Denver, Colorado.

Internet Protocol,"DARPA Internet Program Protocol Specification", (RFC:791), Information Sciences Institute, University of Southern California, Sep. 1981, pp. 1-49.

Kawamoto, D., "Amazon files for Web services patent", CNET News.com, Jul. 28, 2005, pp. 1-2, (http://news.com).

LaMonica M., "Infravio spiffs up Web services registry idea", CNET News.com, May 11, 2004, pp. 1-2, (http://www.news.com).

MacVittie, Lori, "Message-Based Load Balancing," Technical Brief, Jan. 2010, pp. 1-9, F5 Networks, Inc.

"Market Research & Releases, CMPP PoC documentation", last accessed Mar. 29, 2010, (http://mainstreet/sites/PD/Teams/ProdMgmt/MarketResearch/Universal).

"Market Research & Releases, Solstice Diameter Requirements", last accessed Mar. 29, 2010, (http://mainstreet/sites/PD/Teams/ProdMgmt/MarketResearch/Unisversal).

Modiano E., "Scheduling Algorithms for Message Transmission Over a Satellite Broadcast System," MIT Lincoln Laboratory Advanced Network Group, Nov. 1997, pp. 1-7.

Nichols K., et al., "Definition of the Differentiated Services Field (DS Field) in the IPv4 and IPv6 Headers", (RFC:2474) Network Working Group, Dec. 1998, pp. 1-19, (http://www.ietf.org/rfc/rfc2474.txt).

Ott D., et al., "A Mechanism for TCP-Friendly Transport-level Protocol Coordination", USENIX Annual Technical Conference, Jun. 10, 2002, University of North Carolina at Chapel Hill, pp. 1-12.

Padmanabhan V., et al., "Using Predictive Prefetching to Improve World Wide Web Latency", SIGCOM, Jul. 1, 1996, pp. 1-15.

"Respond to server depending on TCP::client_port", DevCentral Forums iRules, pp. 1-6, last accessed Mar. 26, 2010, (http://devcentral.f5.com/Default/aspx?tabid=53&forumid=5&tpage=1&v).

Rosen E., et al., "MPLS Label Stack Encoding", (RFC:3032) Network Working Group, Jan. 2001, pp. 1-22, (http://www.ieft.org/rfc/rfc3032.txt).

Schilit B., "Bootstrapping Location-Enhanced Web Services", University of Washington, Dec. 4, 2003, (http://www.cs.washington.edu/news/colloq.info.html).

Seeley R., "Can Infravio technology revive UDDI?", ADTmag.com, Oct. 22, 2003, (http://www.adtmag.com).

Shohoud, Y., "Building XML Web Services with VB .Net and VB 6", Addison Wesley, Sep. 2002, pp. 1-14.

Sommers F., "Whats New in UDDI 3.0—Part 1", Web Services Papers, Jan. 27, 2003, pp. 1-4, (http://www.webservices.org/index.php/article/articleprint/871/-1/24/).

Sommers F., "Whats New in UDDI 3.0—Part 2", Web Services Papers, Mar. 2, 2003, pp. 1-8, (http://www.web.archive.org/web/20040620131006/).

Sommers F., "Whats New in UDDI 3.0—Part 3", Web Services Papers, Sep. 2, 2003, pp. 1-4, (http://www.webservices.org/index.php/article/articleprint/894/-1/24/).

Sleeper B., "The Evolution of UDDI", UDDI.org White Paper, The Stencil Group, Inc., Jul. 19, 2002, pp. 1-15, San Francisco, California.

Sleeper B., "Why UDDI Will Succeed, Quietly: Two Factors Push Web Services Forward", The Stencil Group, Inc., Apr. 2001, pp. 1-7, San Francisco, California.

"UDDI Overview", Sep. 6, 2000, pp. 1-21, uddi.org, (http://www.uddi.org/).

"UDDI Version 3.0.1", UDDI Spec Technical Committee Specification, Oct. 14, 2003, pp. 1-383, uddi.org, (http://www.uddi.org/).

"UDDI Technical White Paper," Sep. 6, 2000, pp. 1-12, uddi-org, (http://www.uddi.org/).

U.S. Appl. No. 14/032,329 to Masters et al., filed Sep. 20, 2013.

U.S. Appl. No. 14/038,433 to Amdahl, filed Sep. 26, 2013.

U.S. Appl. No. 14/042,237 to Amdahl, filed Sep. 30, 2013.

U.S. Appl. No. 14/081,700 to McCann, filed Nov. 15, 2013.

U.S. Appl. No. 14/139,228 to Lewites et al., filed Dec. 23, 2014.

U.S. Appl. No. 14/144,137 to Amdahl, filed Dec. 30, 2013.

U.S. Appl. No. 14/194,268 to Ridel et al., filed Feb. 28, 2014.

Wang B., "Priority and realtime data transfer over the best-effort Internet", Dissertation Abstract, ScholarWorks@UMASS, Sep. 2005, pp. i-xiv and pp. 1-9.

Wikipedia, "Diameter (protocol)", pp. 1-11, last accessed Oct. 27, 2010, (http://en.wikipedia.org/wiki/Diameter_(protocol)).

Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs_all.jsp?arnumber=832499).

\* cited by examiner

METHODS FOR IMPROVING FLOW CACHE BANDWIDTH UTILIZATION AND DEVICES THEREOF

CROSS-REFERENCE TO RELATED APPLICATIONS

This application claims the benefit of U.S. Provisional Patent Application Ser. No. 61/600,954, filed Feb. 20, 2012, which is hereby incorporated by reference in its entirety.

FIELD

This technology generally relates to network traffic management apparatuses and, more particularly, to network traffic management apparatuses that utilize a flow cache table with a fixed flow cache bandwidth to perform network address translation.

BACKGROUND

Network traffic can be optimized and managed by one or more network traffic management apparatus. A network traffic management apparatus can be located between a local area network (LAN) connecting a plurality of server computing devices of a server computing device pool and a wide area network (WAN), for example. Such a network traffic management apparatus 12 can be configured to obtain requests from client devices on the other side of the WAN to communicate with one of the server computing devices. In a distributed environment, the client device does not have to be aware of or direct communications to, any specific server computing device in order to communicate a request. Instead, the client device can use a virtual Internet protocol (IP) address to communicate with the network traffic management apparatus which can proxy the requests to the various server computing devices in a balanced fashion. In order to proxy the client requests to one of the server computing devices, the network traffic management apparatus transforms the network packets associated with the request based on transformation data and the IP address of the selected server computing device.

In order to appropriately direct server computing device responses to client requests, and direct subsequent network traffic using the same connection, the network traffic management apparatus maintains flow specifications associated with transformation data. The flow specification and transformation data can be maintained in a flow table in a memory, such as a dynamic random access memory (DRAM), coupled to a host processor.

In order to improve throughput, a subset of the full flow table entries can be snooped or inserted by the host processor into a relatively fast, but relatively expensive, static random access memory (SRAM) in a flow cache table. In order to further improve processing throughput, the SRAM can be coupled to configurable hardware logic configured to process network traffic according to transformation data stored in the SRAM. Such insertions require that the configurable hardware logic perform read operations on the flow cache table stored in the SRAM, thereby utilizing flow cache bandwidth.

Accordingly, the network traffic management apparatus can obtain a network packet and generate an index value, such as a hash value, based on the flow specification associated with the network packet. Then, the network traffic management apparatus can compare the flow specification of the flow cache table entry at the index value to the flow specification of the network packet to account for collisions. When the flow specifications match, the network traffic management apparatus transforms the packet according to the transformation data associated with the flow cache table entry. Thereby, the transformation can be performed by the configurable hardware logic for at least a subset of the network traffic. If valid transformation data is not available from the SRAM, the transformation data can be obtained from the full flow table stored in the relatively slow DRAM, and the network packet can be transformed using the relatively slow host processor.

In order to optimize the entries in the flow cache table stored in the SRAM, the configurable hardware logic periodically traverses each entry to determine whether the entry has been marked for eviction, is invalid, has reached a terminal age, or should otherwise be removed. An entry can be marked for eviction if a FIN or RESET network packet is received, for example, although other bases for eviction can also be used. Upon eviction, the entries can return to the full flow table stored in the DRAM. Such scrubbing logic requires that the configurable hardware logic sequentially read each entry of the flow cache table at a predefined interval and, when necessary, write entries back, such as when updating an age value for example. This scrubber process also utilizes flow cache bandwidth.

A cache controller of the configurable hardware logic can manage communications with the SRAM using a bandwidth-limited random access memory (RAM) interface bus connection. However, throughput of the configurable hardware logic, in terms of transformation data lookups, is limited by the bandwidth utilized by flow cache table entry insertions, as well as scrubber performance and associated evictions.

SUMMARY

A network traffic management apparatus including a first memory including a flow cache table including a plurality of entries. The network traffic management apparatus further includes configurable hardware logic coupled to the first memory and a processor, the configurable hardware logic including a valid split table including a plurality of entries, wherein each of the plurality of entries includes a validity bit. The configurable hardware logic is configured to implement periodically determining whether the validity bit of each of the valid split table entries is set. Additionally, the configurable hardware logic is further configured to implement retrieving one of the plurality of flow cache table entries corresponding to an index value associated with one of the valid split table entries, when it is determined that the validity bit of the one of the valid split table entries is set.

A network traffic management apparatus including a first memory including a flow cache table including a plurality of entries, each of the entries including a flow specification and transformation data. The network traffic management apparatus further includes configurable hardware logic coupled to the first memory and a processor. The configurable hardware logic includes a valid split table including a plurality of entries, wherein each of the plurality of valid split table entries includes a validity bit.

The configurable hardware logic of the network traffic management apparatus is configured to implement obtaining a network packet having an associated flow specification and generating an index value based on the flow specification. Next, the configurable hardware logic is configured to implement determining whether the validity bit of one of the valid split table entries corresponding to the index value is set. If the validity bit of the one of the valid split table entries corresponding to the index value is set, the configurable hardware logic is configured to implement retrieving one of the flow cache table entries corresponding to the index value.

The configurable hardware logic is also configured to implement determining whether the flow specification associated with the obtained network packet matches the flow specification of the retrieved flow cache table entry. If the flow specification associated with the obtained network packet matches the flow specification of the retrieved flow cache table entry, the configurable hardware logic is configured to implement transforming the network packet based on the transformation data of the retrieved flow cache table entry. Additionally, the configurable hardware logic is configured to implement communicating the transformed network packet to an external network device.

A network traffic management apparatus includes a first memory including a flow cache table including a plurality of entries. The network traffic management apparatus further includes configurable hardware logic coupled to the first memory and a processor. The configurable hardware logic includes a recently hit split table including a plurality of entries including a recently hit bit. The configurable hardware logic is configured to implement periodically determining whether the recently hit bit of each of the recently hit split table entries is set. If the recently hit bit of one of the recently hit split table entries is not set, the configurable hardware logic is configured to implement retrieving one of the plurality of flow cache table entries corresponding to an index value associated with the recently hit split table entry.

A method for improving flow cache bandwidth utilization includes periodically determining, with a network traffic management apparatus, whether a validity bit of each of a plurality of entries of a valid split table is set. One of a plurality of entries of a flow cache table stored in a first memory is retrieved, with the network traffic management apparatus, the one of the plurality of entries of the flow cache table corresponding to an index value associated with one of the plurality of entries of the valid split table, when it is determined that the validity bit of the one of the plurality of entries of the valid split table is set.

A method for improving flow cache bandwidth utilization includes obtaining, with a network traffic management apparatus, a network packet having an associated flow specification. An index value is generated, with the network traffic management apparatus, based at least in part on at least a portion of the flow specification associated with the obtained network packet. Whether a validity bit of one of a plurality of entries of a valid split table corresponding to the index value is set is determined with the network traffic management apparatus. One of a plurality of entries of a flow cache table stored in a first memory is retrieved, with the network traffic management apparatus, the one of the plurality of entries of the flow cache table corresponding to the index value, when it is determined that the validity bit of the one of the plurality of entries of the valid split table corresponding to the index value is set.

Whether the flow specification associated with the obtained network packet matches the flow specification of the retrieved one of the plurality of entries of the flow cache table is determined with the network traffic management apparatus. The network packet is transformed, with the network traffic management apparatus, based on transformation data included in the retrieved one of the plurality of entries of the flow cache table, when it is determined that the flow specification associated with the obtained network packet matches the flow specification of the retrieved one of the plurality of entries of the flow cache table. The transformed network packet is communicated, with the network traffic management apparatus, to an external network device.

A method for improving flow cache bandwidth utilization includes periodically determining, with a network traffic management apparatus, whether a recently hit bit of each of a plurality of entries of a recently hit split table is set. One of the plurality of entries of a flow cache table stored in a first memory is retrieved, with the network traffic management apparatus, the one of the plurality of entries of the flow cache table corresponding to an index value associated with one of the plurality of entries of the recently hit split table, when it is determined that the recently hit bit of the one of the plurality of entries of the recently hit split table is not set.

This technology provides a number of advantages including methods and network traffic management apparatuses configured to utilize a valid split table and/or a recently hit split table to reduce the amount of flow cache bandwidth used for scrubber reads and/or to retrieve invalid entries of a flow cache table. With this technology, more flow cache bandwidth is available for packet-driven lookups thereby improving packet throughput.

DETAILED DESCRIPTION

Figure 1:
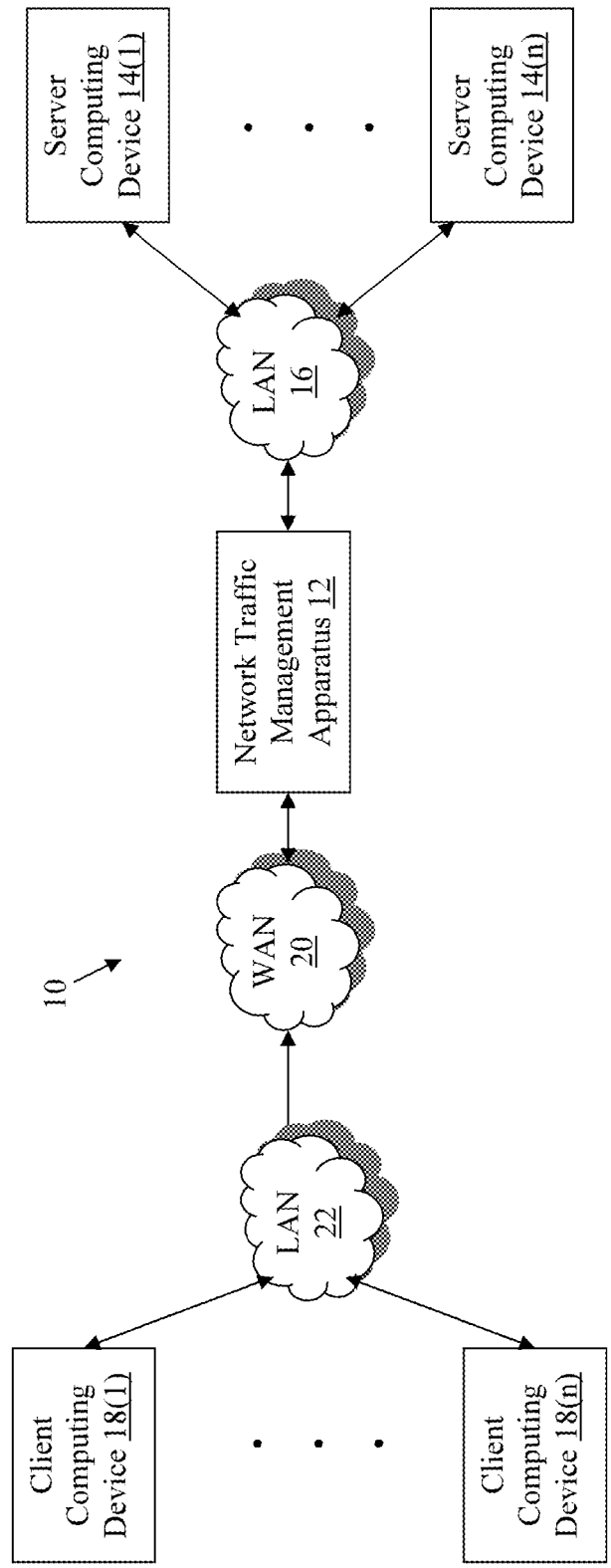
FIG. 1 is a block diagram of a network environment which incorporates an exemplary network traffic management apparatus.

An exemplary network environment 10 is illustrated in FIG. 1 as including an exemplary network traffic management apparatus 12. In this example, the network traffic management apparatus 12 is coupled to a plurality of server computing devices 14(1)-14(n) by a local area network (LAN) 16 and a plurality of client computing devices 18(1)-18(n) by a wide area network (WAN) 20 and another LAN 22, although other types and numbers of devices, components, and elements in other topologies could be used. This technology provides a number of advantages including methods and network traffic management apparatuses with improved flow cache bandwidth utilization and associated network traffic throughput.

Figure 2:
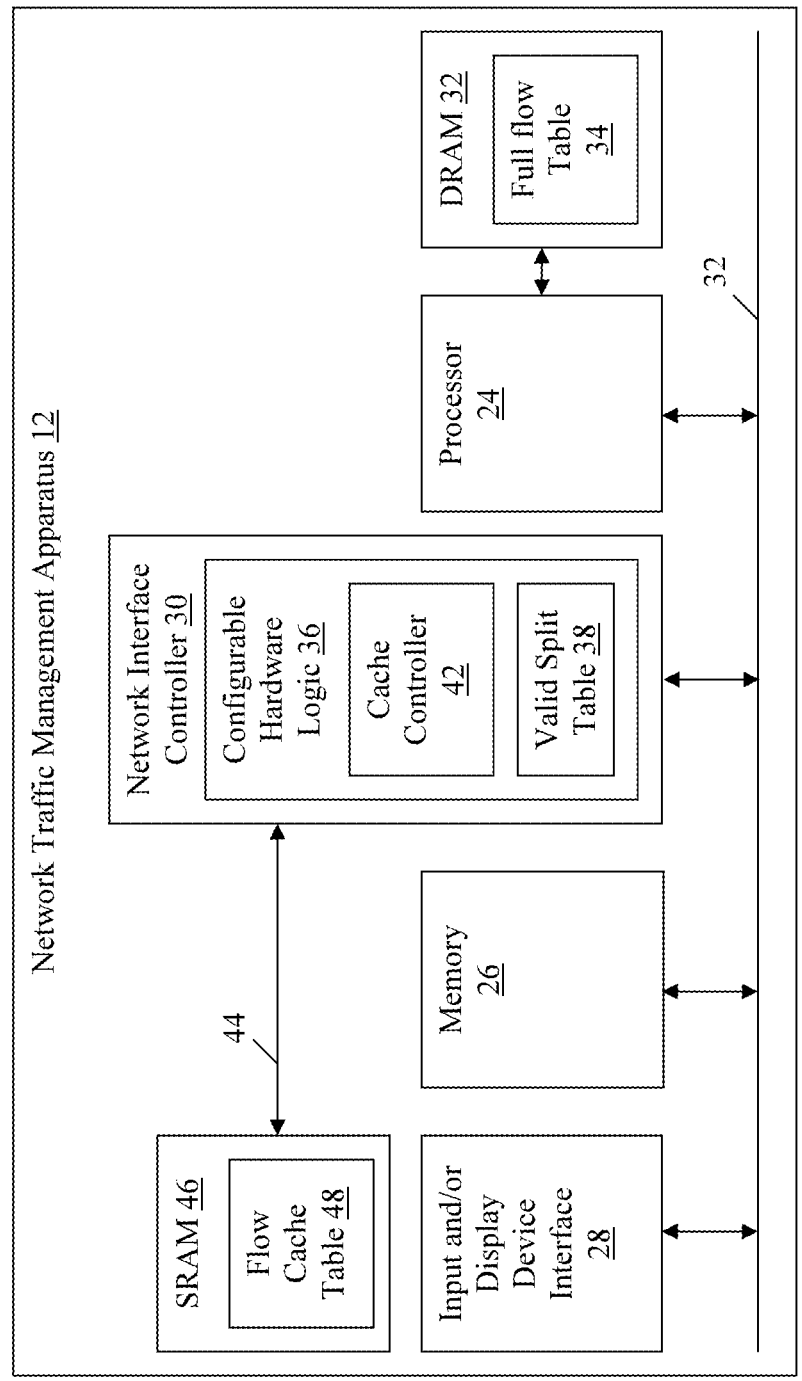
FIG. 2 is a block diagram of the exemplary network traffic management apparatus including an exemplary valid split table.
Figure 3:
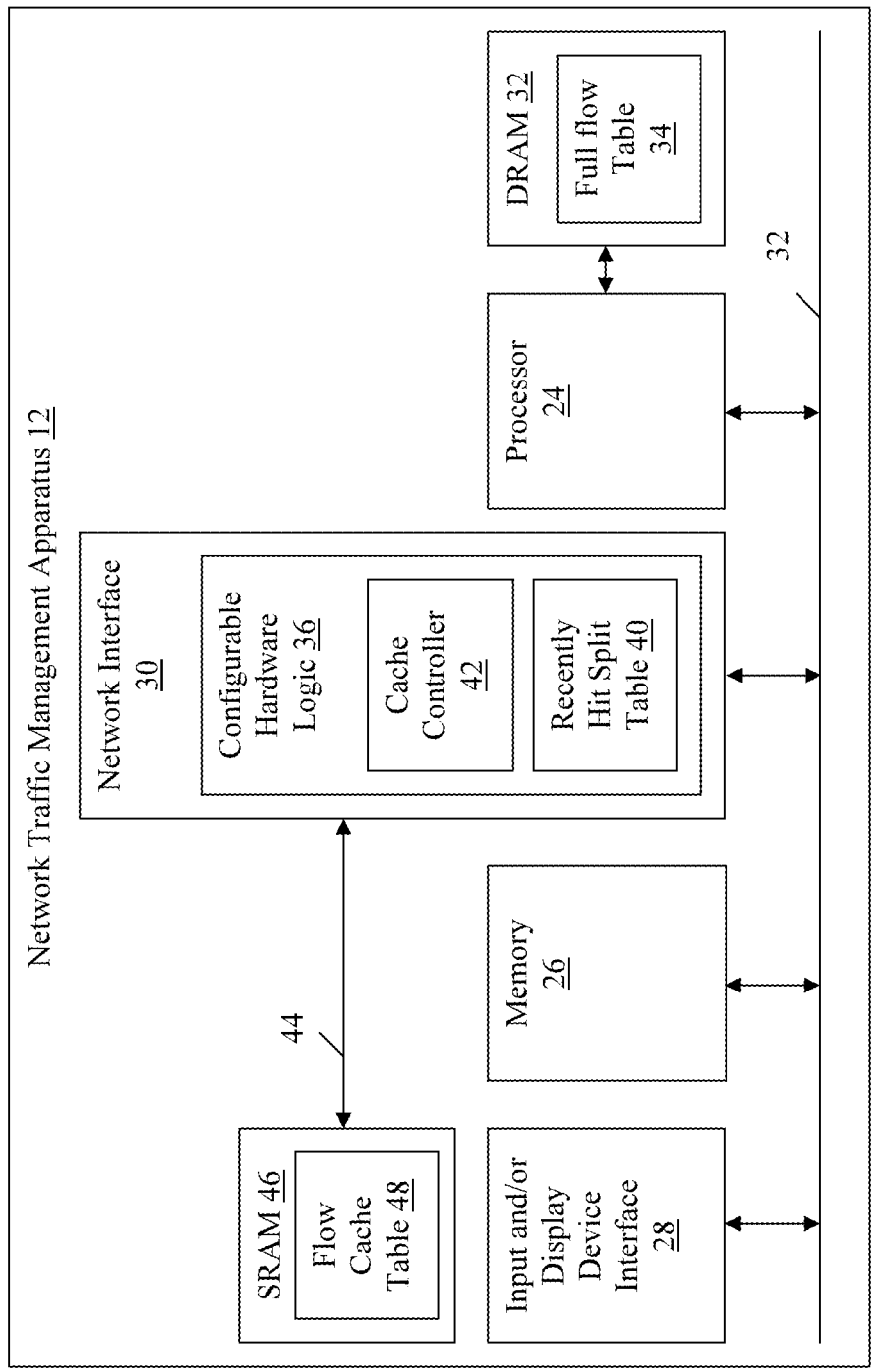
FIG. 3 is a block diagram of the exemplary network traffic management apparatus including an exemplary recently hit split table.

Referring to FIGS. 1-3, the network traffic management apparatus 12 may perform any number of functions, such as optimizing, securing and accelerating the network traffic between the client computing devices 18(1)-18(n) and the server computing devices 14(1)-14(n). The network traffic management apparatus 12 includes at least one processor or CPU 24, a memory 26, an input and/or display device interface 28, and a network interface controller 30 which are coupled together by a bus 32, although the network traffic management apparatus 12 may include other types and numbers of elements in other configurations. In this example, the bus 32 is a PCI express (PCIe), although other bus types and communication links may be used.

The processor 24 of the network traffic management apparatus 12 may execute one or more computer-executable instructions stored in the memory 26 of the network traffic management apparatus 12 for the any number of the functions identified above for managing network traffic. The processor 24 of the network traffic management apparatus 12 may include one or more central processing units (CPUs) or general purpose processors with one or more processing cores, such as Intel® processor, although other types of processors could be used (e.g., AMD®). Additionally, the processor 24 may be coupled to a memory such as a dynamic random access memory (DRAM) 32 configured to store a full flow table 34, as described and illustrated in more detail below.

The memory 26 of the network traffic management apparatus 12 may include one or more tangible storage media and/or devices, such as RAM, ROM, flash memory, CD-ROM, floppy disk, hard disk drive(s), solid state memory, DVD, or any other memory storage types or devices, including combinations thereof, which are known to those of ordinary skill in the art. The memory 26 of the network traffic management apparatus 12 may store one or more instructions of this technology as illustrated and described with reference to the examples herein that may be executed by the processor 24.

The input and display device interface 28 of the network traffic management apparatus 12 enables a user, such as an administrator, to interact with the network traffic management apparatus 12, such as to input and/or view data and/or to configure, program and/or operate it by way of example only. Input devices (not shown) coupled to the input and display device interface 28 may include a keyboard and/or a computer mouse and display devices (not shown) coupled to the input and display device interface 28 may include a computer monitor, although other types and numbers of input devices and display devices could be used.

The network interface controller 30 operatively couples and communicates between the network traffic management apparatus 12, the client computing devices 18(1)-18(n), and the server computing devices 14(1)-14(n), which are all coupled together by the LANs 16, 22 and WAN 20, although other types and numbers of communication networks or systems with other types and numbers of connections and configurations to other devices and elements can also be used. The LANs 16, 22 and WAN 20 can use TCP/IP over Ethernet and industry-standard protocols, including NFS, CIFS, SOAP, XML, LDAP, and SNMP, although other types and numbers of communication networks can be used. The network interface controller 30 can be capable of implementing the steps of this technology as illustrated and described with reference to the examples herein.

In this example, the network interface controller 30 further includes configurable hardware logic 36 which may comprise specialized hardware configured to implement one or more steps of this technology as illustrated and described with reference to the examples herein. By way of example only, the configurable hardware logic 36 may comprise one or more of field programmable gate arrays (FPGAs), field programmable logic devices (FPLDs), application specific integrated circuits (ASICs) and/or programmable logic units (PLUs).

In the example shown in FIG. 2, the configurable hardware logic 36 is further configured to store a valid split table 38 and in the example shown in FIG. 3 the configurable hardware logic 36 is further configured to store a recently hit split table 40, although the configurable hardware logic 36 can also be configured to store both a valid split table 38 and a recently hit split table 40. Additionally, the configurable hardware logic 36 includes a cache controller 42 configured to manage communications over a RAM interface bus 44 with a memory, such as static random access memory (SRAM) 46, configured to store a flow cache table 48, as described and illustrated in more detail below.

Each of the client computing devices 18(1)-18(n) and server computing devices 14(1)-14(n) includes at least one processor or CPU, a memory, a network interface, and an I/O system, which are coupled together by a bus or other link, although other numbers and types of network devices could be used. The client computing devices 18(1)-18(n) may run interface applications, such as Web browsers, that may provide an interface to make requests for and send content and/or data to applications or services provided by the server computing devices 14(1)-14(n) via the LANs 16, 22 and/or WAN 20.

Generally, the server computing devices 14(1)-14(n) process requests received from requesting client computing devices 18(1)-18(n) via LANs 16, 22 and/or WAN 20 according to the HTTP-based application RFC protocol or the CIFS or NFS protocol for example. Various network processing applications, such as CIFS applications, NFS applications, HTTP Web Server computing device applications, and/or FTP applications, may be operating on the server computing devices 14(1)-14(n) and transmitting data (e.g., files, Web pages) to the network traffic management apparatus 12 in response to requests from the client computing devices 18(1)-18(n).

The server computing devices 14(1)-14(n) may provide data or receive data in response to requests directed toward the respective applications on the server computing devices 14(1)-14(n) from the client computing devices 18(1)-18(n). The server computing devices 14(1)-14(n) may be hardware or software or may represent a system with multiple server computing devices 14(1)-14(n) in a server computing device pool, which may include internal or external networks. In this example the server computing devices 14(1)-14(n) may be any version of Microsoft® IIS server or Apache® server, although other types of server computing devices 14(1)-14(n) may be used. Further, additional server computing devices 14(1)-14(n) may be coupled to LAN 16 and many different types of applications may be available on each of the server computing devices 14(1)-14(n).

Although an exemplary network environment with the client computing devices 18(1)-18(n), network traffic management apparatus 12, server computing devices 14(1)-14(n), LANs 16, 22 and WAN 20 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 4:
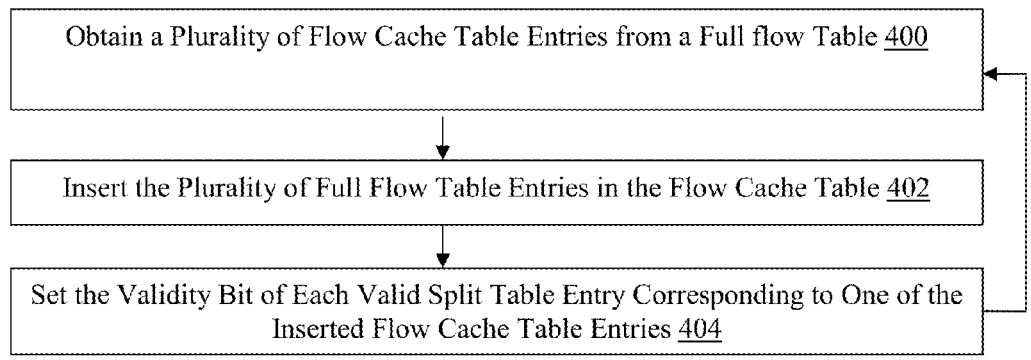
FIG. 4 is a flowchart of an exemplary method for flow cache table insertions using an exemplary valid split table.

An exemplary network traffic management apparatus 12 with improved flow cache bandwidth utilization will now be described with reference to FIGS. 1-8. Referring specifically to FIG. 4, an exemplary method for inserting entries into the flow cache table 48 using the valid split table 38 will now be described. In this example, in step 400, the configurable hardware logic 36 obtains a plurality of entries from the full flow table 34 stored in the DRAM 32, which is coupled to the processor 24 of the network traffic management apparatus 12. While the SRAM 46 is used to store a flow cache table 48 storing flow information for a subset of the flows, the SRAM 46 is relatively expensive as compared to the DRAM 32. As it is cost-prohibitive in many implementations to store the full flow table in SRAM, DRAM 32 is often used to store the full flow table and the SRAM 46 is used to store information for a subset of flows in order to optimize throughput.

The configurable hardware logic 36 of the network traffic management apparatus 12 can be configured to implement determining which entries should be obtained from the full flow table 34, although instructions for determining which entries are obtained can also be stored in the memory 26. For example, full flow table entries can be obtained based on whether they are referenced relatively frequently, associated with relatively high performance flows, are relatively long-lived, or based on any other criteria. By storing information for a subset of the flows in the flow cache table 48 of the SRAM 46, network traffic associated with the subset of flows can be processed relatively quickly as compared to network traffic associated with flows having associated information stored in the full flow table 34 in the DRAM 32.

In step 402, the configurable hardware logic 36 inserts each of the entries obtained from the full flow table 34 into the flow cache table 48 stored in the SRAM 46. The entries of the full flow table 34 or the flow cache table 48 can be stored as associated with an index value. The index value can be generated by the configurable hardware logic 36 by applying a hash function to at least a portion of the flow specification associated with each of the entries. The flow specification can include source and destination Internet protocol (IP) addresses, source and destination IP ports, information regarding the protocol used by the flow, and/or a virtual LAN network address, for example. In addition to inserting the entries obtained from the full flow table 34 into the flow cache table 48, optionally, associated state information can also be communicated to the flow cache table 48.

In step 404, the configurable hardware logic 36 sets a validity bit a plurality of entries of the valid split table 38. The plurality of entries of the valid split table 38 each correspond to one of the entries inserted into the flow cache table 48. The valid split table 38 can be a one bit wide table of N length where N is the total number of possible entries in the flow cache table 48. In some examples, the valid split table 38 can be stored on-chip in the configurable hardware logic 36, although the valid split table 38 can be stored elsewhere. Accordingly a validity bit can be set for each entry of the full flow table 34 inserted into the flow cache table 48. The appropriate validity bit to be set is determined based on the index value associated with each entry inserted into the flow cache table 48.

Figure 5:
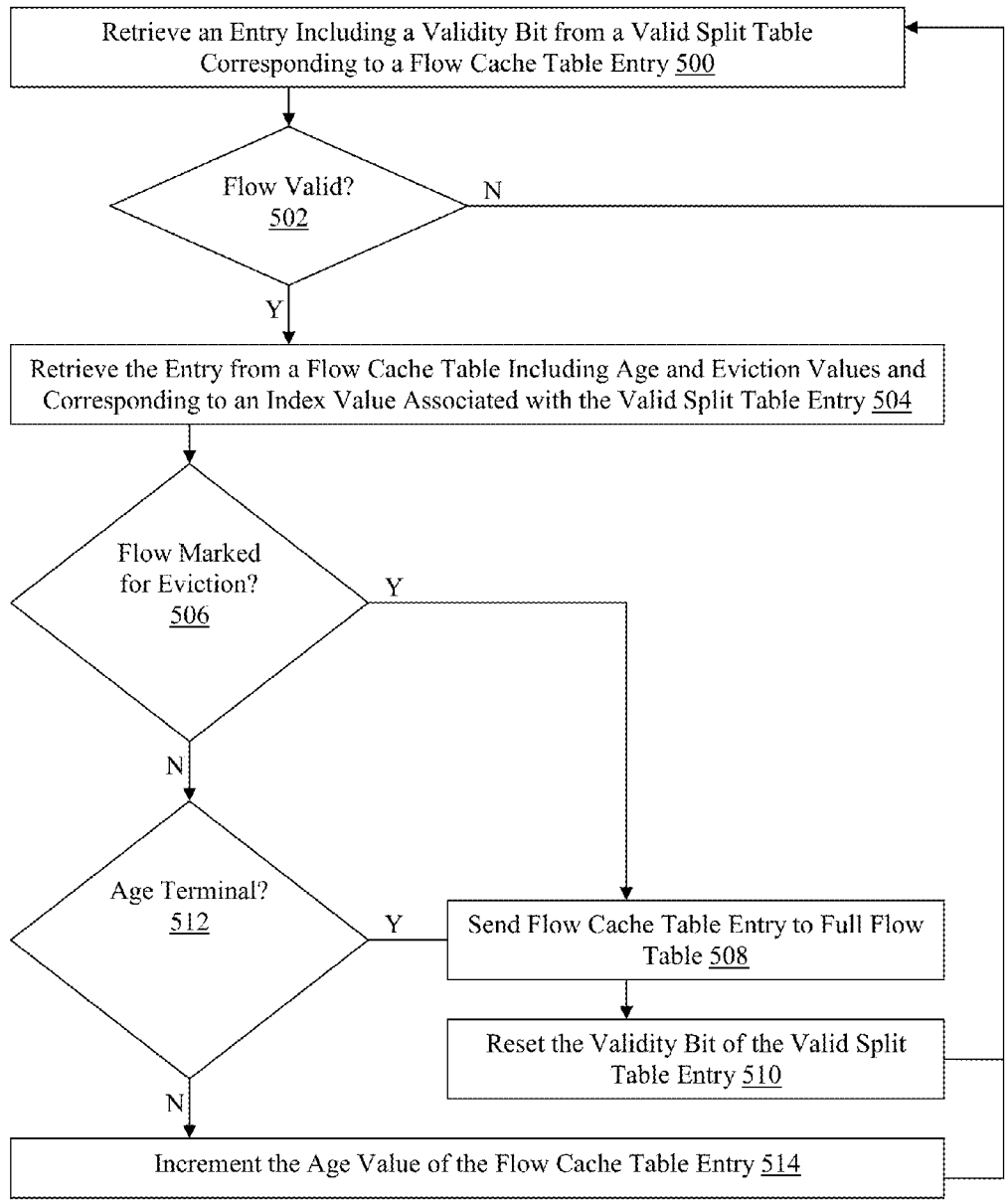
FIG. 5 is a flowchart of an exemplary method for scrubbing a flow cache table using a valid split table.

Referring to FIG. 5, an exemplary method for scrubbing the flow cache table 48 using the valid split table 38 will now be described. In this example, in step 500, the configurable hardware logic 36 retrieves an entry including a validity bit from the valid spit table 38. The retrieved entry of the valid split table 38 corresponds to an entry of the flow cache table 48 based on an index value generated as described earlier.

In step 502, the configurable hardware logic 36 determines whether the validity bit of the retrieved entry of the valid split table 38 has been set, for example as described and illustrated earlier with reference to step 404 of FIG. 4. If the validity bit of the retrieved entry of the valid split table 38 is not set, then the No branch is taken back to step 500 and another entry is retrieved from the valid split table 38, such as at a defined time interval. Accordingly, if the No branch is taken, no flow cache bandwidth is utilized because the configurable hardware logic 36 does not have to read an entry of the flow cache table 48 to determine whether the entry is invalid or needs to be evicted.

If the validity bit of the retrieved entry of the valid split table 38 is set, then the Yes branch is taken to step 504. In step 504, the configurable hardware logic 36 retrieves the entry of the flow cache table 48 corresponding to the retrieved entry of the valid split table 38. In this example, in addition to the flow specification and transformation data, each entry of the flow cache table 48 is configured to store an age value indicating a relative length of time the entry has been in the flow cache table 48 and an eviction value indicating whether the entry of the flow cache table 48 has been marked for removal from the flow cache table 48.

In step 506, the configurable hardware logic 36 determines whether the retrieved entry of the flow cache table 48 has been marked for eviction based on the eviction value. The configurable hardware logic 36 can be configured to mark entries of the flow cache table 48 for eviction by setting the eviction value, such as in response to receipt of a FIN or RESET network packet, for example. The eviction value may indicate that the flow is unlikely to be utilized in the near future and should be removed to the relatively slower full flow table 38.

Accordingly, if the retrieved entry of the flow cache table 48 is marked for eviction, then the Yes branch is taken to step 508. In step 508, the configurable hardware logic 36 sends the entry of the flow cache table 48 to the full flow table 34 stored in the DRAM 32 coupled to the processor 24 of the network traffic management apparatus 12, for example. In addition to sending the entry of the flow cache table 48, optionally, associated state information can also be communicated to the full flow table 34.

In step 510, the configurable hardware logic 36 resets the validity bit of an entry of the valid split table 38 corresponding to the evicted entry of the flow cache table 48, as determined based on the associated index value. Accordingly, validity bits in the valid split table 38 are set whenever an entry of the full flow table 34 is inserted into the flow cache table 48 and validity bits in the valid split table 38 are reset whenever an entry of the flow cache table 48 is evicted and sent to the full flow table 34.

If the configurable hardware logic 36 determines that the entry of the flow cache table 48 is not marked for eviction in the step 506, in step 512, the configurable hardware logic 36 determines whether the age value of the retrieved entry of the flow cache table 48 exceeds a threshold terminal age value. The age value can be a numerical value which is reset upon insertion of an entry of the full flow table 34 into the flow cache table 48, as well as each time an entry of the flow cache table 48 is retrieved in response to a packet-driven lookup.

If the configurable hardware logic 36 determines that the age value of the retrieved entry of the flow cache table 48 does not exceed a threshold terminal age value, in step 514, the configurable hardware logic 36 increments the age value of the retrieved entry of the flow cache table 48 and writes the entry back to the flow cache table 48.

If the configurable hardware logic 36 determines the age value of the retrieved entry of the flow cache table 48 exceeds a threshold terminal age value in step 512, the entry of the flow cache table 48 is evicted and the corresponding validity bit is reset, as described and illustrated earlier with reference to steps 508 and 510, respectively.

Accordingly, every time an entry of the flow cache table 48 is retrieved during the scrubbing process, the age value is incremented. If an entry of the flow cache table 48 is not retrieved in response to a packet-driven lookup prior to the entry of the flow cache table 48 being retrieved a number of times, as defined by the terminal age value, the entry of the flow cache table 48 is evicted and the corresponding validity bit stored in the valid split table 38 is reset. The corresponding validity bit is reset to indicate that the entry of the flow cache table 48 is no longer valid and can instead be found in the full flow table 34.

In this example, upon determining the entry of the flow cache table 48 is not valid, resetting the validity bit associated with the entry of the flow cache table 48, or incrementing the age value of the entry of the flow cache table 48, the configurable hardware logic 36 proceeds to retrieve the next entry of the valid split table 38 in step 500. This scrubber process can proceed indefinitely such that a new entry of the valid split table 38 is periodically retrieved at a defined time interval as facilitated by timer logic of the network traffic management apparatus 12

Accordingly, by maintaining a valid split table 38 including validity bits set upon insertion of an entry of the full flow table 34 into the flow cache table 48 and reset upon eviction of an entry of the flow cache table 48, the scrubber process does not require that the configurable hardware logic 36 read every entry of the flow cache table 48. Instead, the configurable hardware logic 36 can inspect an entry of the valid split table 38, in relatively less time and without consuming flow cache bandwidth, in order to determine that an entry of the flow cache table 48 is not valid and has been previously evicted. By reducing the flow cache bandwidth utilization of the scrubber process, additional flow cache bandwidth is available for the packet-driven lookup process, thereby increasing throughput and improving response time to the client computing devices 18(1)-18(n).

Figure 6:
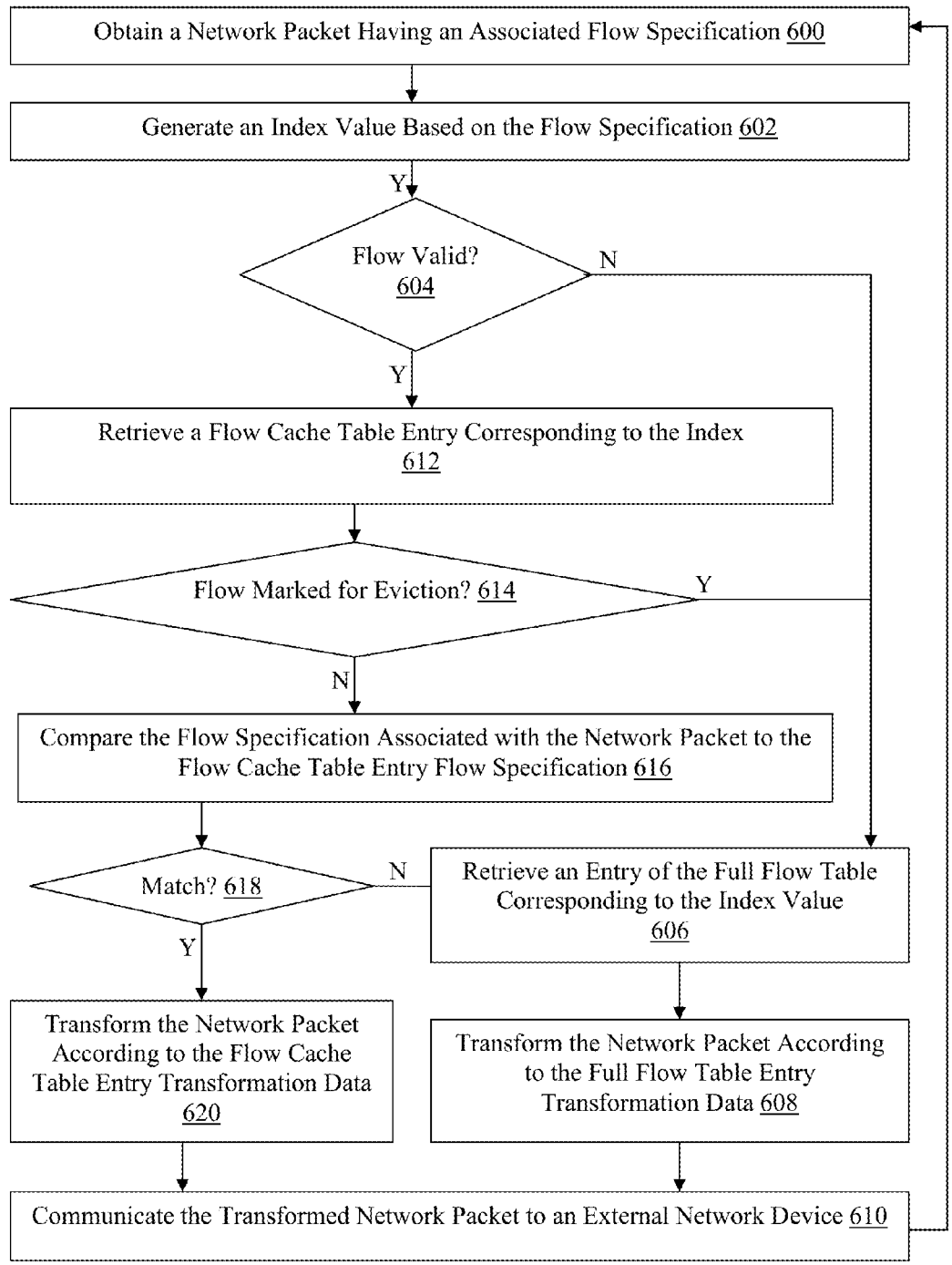
FIG. 6 is a flowchart of an exemplary method for packet-driven lookups using a valid split table.

Referring specifically to FIG. 6, an exemplary method for packet-driven lookups using the valid split table 38 will now be described. In step 600, the configurable hardware logic 36 obtains a network packet having an associated flow specification from one of the client computing devices 18(1)-18(n) or one of the server computing devices 14(1)-14(n). In step 602, the configurable hardware logic 36 generates an index value based on the flow specification, such as by applying a hash function to one or more portions of the flow specification, for example.

In step 604, the configurable hardware logic 36 determines whether an entry of the flow cache table 48 corresponding to the generated index value is valid based on a validity bit in an entry of the valid split table 38 corresponding to the generated index value. If the validity bit of the corresponding entry of the valid split table 38 is not set, then the No branch is taken to step 606.

In step 606, the processor 24 of the network traffic management apparatus 12 retrieves an entry of the full flow table 34 in the DRAM 32. The retrieved entry of the full flow table 34 corresponds to the index value generated in step 602 and includes at least a flow specification and transformation data.

In step 608, the processor 24 of the network traffic management apparatus 12 transforms the network packet obtained in step 600 based on the transformation data included in the retrieved entry of the full flow table 34. The transformation data includes information used by the network traffic management apparatus 12 to translate a network address included in the obtained network packet so that the network packet is routed appropriately.

In step 610, the processor 24 of the network traffic management apparatus 12 communicates the transformed network packet to an external network device, such as one of the server computing devices 14(1)-14(n), for example.

Referring back to step 604, if the configurable hardware logic 36 determines that the validity bit of the corresponding entry of the valid split table 38 is set, and the entry of the flow cache table 48 corresponding to the index value generated in step 602 is valid, then the Yes branch is taken to step 612. In step 612, the configurable hardware logic 36 retrieves the entry of the flow cache table 48 corresponding to the index value generated in step 602. In this example, the entry of the flow cache table 48 includes at least a flow specification, transformation data, and an eviction value.

In step 614, the configurable hardware logic 36 determines whether the retrieved entry of the flow cache table 48 is marked for eviction based on the eviction value included in the entry. In this example, an entry of the flow cache table 48 may have been marked for eviction although a scrubber process, such as described and illustrated earlier with reference to FIG. 5, may not have traversed the entry of the flow cache table 48 yet. If the scrubber process has not reached an entry of the flow cache table 48 that has been marked for eviction, the associated validity bit in a corresponding entry of the valid split table 38 may still be set. Accordingly, if the retrieved entry of the flow cache table 48 has been marked for eviction, then the Yes branch is taken to step 606. In step 606, the network traffic management apparatus 12 proceeds to process the packet-driven lookup based on programmed instructions stored in the memory 26 and executed by the processor 24, as described and illustrated earlier.

If the retrieved entry of the flow cache table 48 has not been marked for eviction, then the No branch is taken to step 616. In step 616, the configurable hardware logic 36 compares the flow specification associated with the network packet to the flow specification included in the retrieved entry of the flow cache table 48. The comparison is required in some examples in which a hash function is used to generate the index value in step 602 because a collision may occur and the entry of the flow cache table 48 corresponding to the generated index value may not be associated with the obtained network packet.

Accordingly, in step 618, the configurable hardware logic 36 determines whether at least a portion of the flow specifications match in order to confirm that the entry of the flow cache table 48 and the obtained network packet are associated with the same flow. If the configurable hardware logic 36 determines that the flow specifications do not match, then the No branch is taken to step 606. In step 606, the network traffic management apparatus 12 proceeds to process the packet-driven lookup based on programmed instructions stored in the memory 26 and executed by the processor 24, as described and illustrated earlier.

If, in step 618, the configurable hardware logic 36 determines that the flow specifications do match, then the Yes branch is taken to step 620. In step 620, the configurable hardware logic 36 transforms the network packet according to the transformation data included in the retrieved entry of the flow cache table 48. Subsequent to transforming the network packet, the network traffic management apparatus 12 communicates the transformed network packet in step 610, as described and illustrated earlier.

Accordingly, in this example, a packet-driven lookup of transformation data is performed without reading an entry of the flow cache table 48, and utilizing flow cache bandwidth, when the entry of the flow cache table 48 located at the generated index value is invalid. Instead, a validity bit stored at a location of the valid split table 38 corresponding to the index value can be inspected. If the validity bit is not set, an entry can be retrieved from the full flow table 34. Thereby, entries of the flow cache table 48 that were previously evicted are not read in response to a packet-driven lookup and more flow cache bandwidth is available for processing packet-driven lookups using valid entries of the flow cache table 48.

Figure 7:
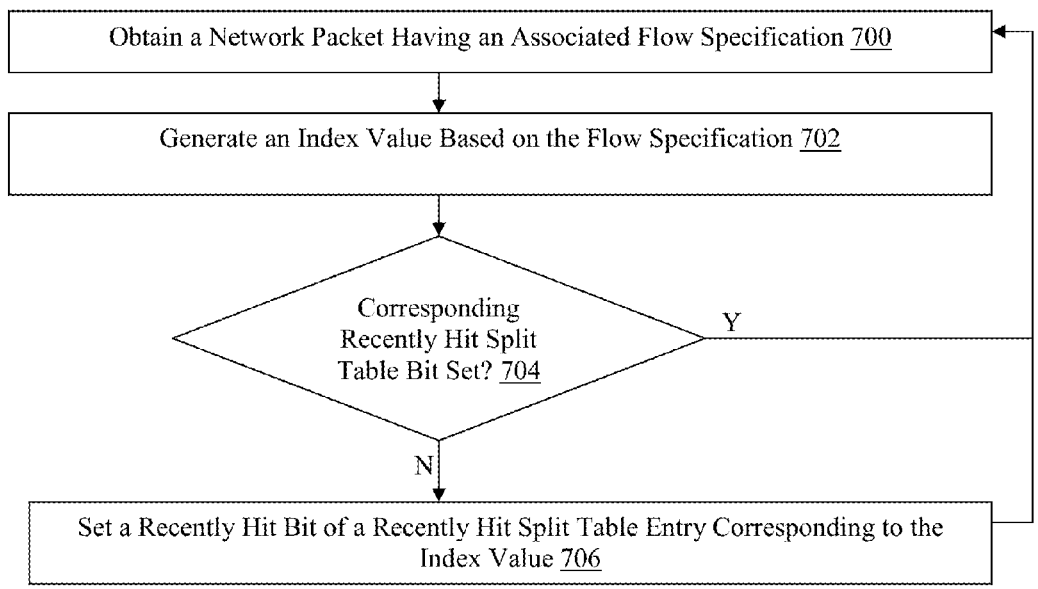
FIG. 7 is a flowchart of an exemplary method for maintaining a recently hit split table.

Referring to FIG. 7, an exemplary method for maintaining the recently hit split table 40 will now be described. In this example, in step 700, the configurable hardware logic 36 obtains a network packet having an associated flow specification from one of the client computing device 18(1)-18(n) or one of the server computing devices 14(1)-14(n). In step 702, the configurable hardware logic 36 generates an index value based on at least a portion of the flow specification, such as described and illustrated above with reference to step 602 of FIG. 6.

In step 704, the configurable hardware logic 36 determines whether an entry of the recently hit split table 40 corresponding to the generated index value includes a recently hit bit that is set. The recently hit split table 40 can be a one bit wide table of N length where N is the total number of possible entries in the flow cache table 48. In some examples, the recently hit split table 40 can be stored on-chip in the configurable hardware logic 36, although the recently hit split table 40 can be stored elsewhere. If the configurable hardware logic 36 determines that the recently hit bit of the entry of the recently hit split table 40 corresponding to the generated index value is set, then Yes branch is taken to step 700 and another network packet is obtained.

If, in step 704, the configurable hardware logic 36 determines that the recently hit bit of the entry of the recently hit split table 40 corresponding to the generated index value is set, then the Yes branch is taken to step 706. In step 706, the configurable hardware logic 36 sets the recently hit bit of the entry of the recently hit split table 40 corresponding to the generated index value. Subsequent to setting the recently hit bit, or at any time prior, another network packet can be obtained in step 700 and processed according to steps 702-706.

Accordingly, for each network packet obtained by the network traffic management apparatus 12, a recently hit bit of the recently hit split table 40 is set, if there is a corresponding entry of the recently hit split table 40. The recently hit bits are located in entries of the recently hit split table 40 corresponding to index values generated based on at least a portion of each flow specification.

Figure 8:
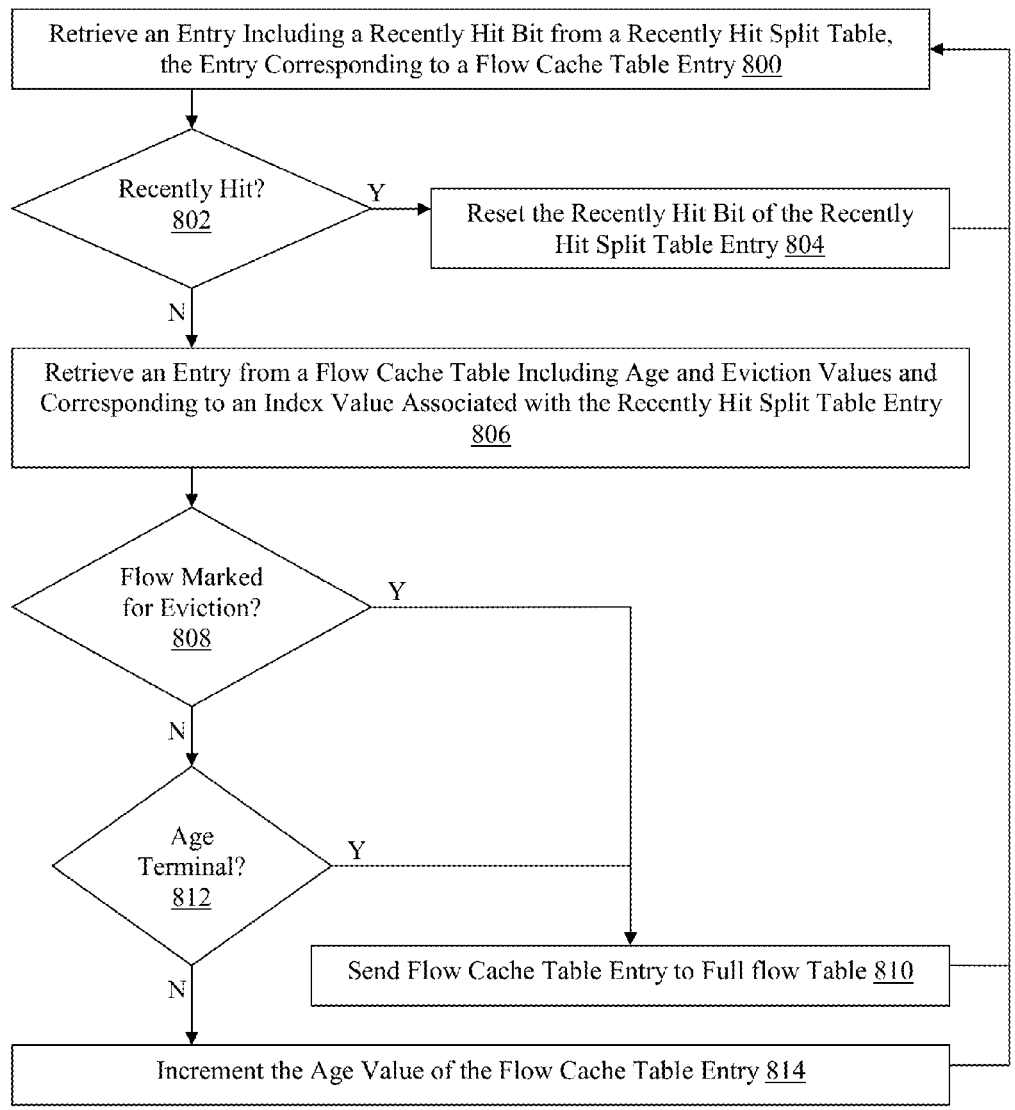
FIG. 8 is a flowchart of an exemplary method for scrubbing a flow cache table using a recently hit split table.

Referring to FIG. 8, an exemplary method for scrubbing the flow cache table 48 using the recently hit split table 40 will now be described. In this example, in step 800, the configurable hardware logic 36 retrieves an entry including a recently hit bit from the recently hit split table 40. The retrieved entry of the recently hit split table 40 has an associated index value corresponds to an index value of an entry of the flow cache table 48.

In step 802, the configurable hardware logic 36 determines whether the recently hit bit of the retrieved entry of the recently hit split table 40 has been set, such as described and illustrated earlier with reference to step 706 of FIG. 7. If the recently hit bit of the retrieved entry of the recently hit split table 40 is set, then the Yes branch is taken to step 804.

In step 804, the configurable hardware logic 36 resets the recently hit bit of the retrieved entry of the recently hit split table 40. Accordingly, if the recently hit bit of the retrieved entry of the recently hit split table 40 is set, no flow cache bandwidth is utilized. The configurable hardware logic 36 does not have to read the entry of the flow cache table 48 to determine whether the entry is invalid or needs to be evicted. Instead, inspection of the recently hit bit in the corresponding entry of the recently hit split table 40 indicates a corresponding entry of the flow cache table 48 was recently utilized to transform a network packet and, therefore, should not be evicted on this traversal of the scrubbing process.

Referring back to step 802, if the configurable hardware logic 36 determines that the recently hit bit of the retrieved entry of the recently hit split table 40 is not set, then the No branch is taken to step 806. If the recently hit bit of the retrieved entry of the recently hit split table 40 is not set, the corresponding entry of the flow cache table 48 has not been accessed to transform a data packet at least since the scrubbing process last retrieved the corresponding entry of the recently hit split table 40. Accordingly, in step 806 the configurable hardware logic 36 retrieves the entry of the flow cache table 48 corresponding to the retrieved entry of the recently hit split table 40. In this example, in addition to the flow specification and transformation data, each entry of the flow cache table 48 includes an age value and an eviction value.

In step 808, the configurable hardware logic 36 determines whether the retrieved entry of the flow cache table 48 has been marked for eviction based on the eviction value included in the retrieved entry. The configurable hardware logic 36 can be configured to mark entries of the flow cache table for eviction by setting the eviction value, such as in response to receipt of a FIN or RESET network packet, for example, as described and illustrated earlier with reference to step 506 of FIG. 5. The eviction value may indicate that the flow is unlikely to be utilized in the near future and should be removed to the relatively slow full flow table 34 stored in the DRAM 32. If the retrieved entry of the flow cache table 48 is marked for eviction, then the Yes branch is taken to step 810.

In step 810, the configurable hardware logic 36 sends the retrieved entry of the flow cache table 48 to the full flow table 34 stored in the DRAM 32 of the network traffic management apparatus 12. In addition to sending the retrieved entry of the flow cache table 48 to the full flow table 34, optionally, associated state information can also be communicated to the full flow table 34.

Referring back to step 808, if the configurable hardware logic 36 determines that the retrieved entry of the flow cache table 48 is not marked for eviction, then the No branch is taken to step 812. In step 812, the configurable hardware logic 36 determines whether the age value of the retrieved entry of the flow cache table 48 exceeds a threshold terminal age value. The age value can be a numerical value which is reset upon insertion of an entry of the full flow table 34 into the flow cache table 48, as well as each time an entry of the flow cache table 48 is retrieved in response to a packet-driven lookup.

If the configurable hardware logic 36 determines that the age value of the retrieved entry of the flow cache table 48 does not exceed a threshold terminal age value, then the No branch is taken to step 814. In step 814, the configurable hardware logic 36 increments the age value of the retrieved entry of the flow cache table 48 and writes the entry back to the flow cache table 48.

Referring back to step 812, if the configurable hardware logic 36 determines that the age value of the retrieved entry of the flow cache table 48 exceeds the threshold terminal age value, then the Yes branch is taken to step 810. In step 810, the entry of the flow cache table 48 is evicted, as described and illustrated earlier.

In this example, upon resetting the recently hit bit, sending the entry of the flow cache table 48 to the full flow table 34, or incrementing the age value of the entry of the flow cache table 48, the configurable hardware logic 36 proceeds to retrieve the next entry of the recently hit split table 40 in step 800. This scrubber process can proceed indefinitely such that a new entry of the recently hit split table 40 is periodically retrieved at a defined time interval as facilitated by timer logic, for example.

Accordingly, by maintaining the recently hit split table 40 including recently hit bits, set upon obtaining a network packet having a corresponding entry in the flow cache table 48, and the scrubber process does not require that the configurable hardware logic 36 read every entry of the flow cache table 48. Instead, the configurable hardware logic 36 can inspect an entry of the recently hit split table 40, in relatively less time and without consuming flow cache bandwidth, in order to determine that a corresponding entry of the flow cache table 48 has been recently accessed and should not be evicted. Thereby, the entries of the recently hit split table 40 are effectively a first level of aging that can be accessed without consuming flow cache bandwidth, and utilized to avoid accessing entries of the flow cache table 48 for active flows. By reducing the flow cache bandwidth utilization of the scrubber process, additional flow cache bandwidth is available for the packet-driven lookups, thereby increasing throughput and improving response time to the client computing devices 18(1)-18(n).

It should be appreciated that, in some examples, the network traffic management apparatus 12 includes both a valid split table 38 and a recently hit split table 40. In these examples, the scrubber process can be performed utilizing a combination of methods described and illustrated earlier with reference to FIGS. 5 and 8 and by inspecting both the valid split table 38 and recently hit split table 40 before accessing the flow cache table 48. In these examples, if a validity bit indicates a corresponding entry of the flow cache table 48 is valid, the recently hit split table 40 can be utilized to determine whether the corresponding entry of the flow cache table 48 was recently utilized in a packet-drive lookup process, such that only a subset of valid entries of the flow cache table 48 need to be retrieved during a scrubber process.

By this technology, a valid split table is used by configurable hardware logic of the network traffic management apparatus to filter packet-driven lookup and/or scrubber reads of entries of the flow cache table, such that invalid entries are not retrieved. Additionally, the recently hit split table can be utilized to filter scrubber reads of entries of the flow cache table such that entries that have been recently utilized are not retrieved. Accordingly, the flow cache table is not accessed to retrieve entries that are invalid and not useful to transform network packets and/or are not ready for eviction. As a result, flow cache bandwidth utilization is improved and an increased portion of flow cache bandwidth is available for packet-driven lookups, thereby improving network packet throughput and response time to the client computing devices.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A network traffic management apparatus, comprising:
   a first memory including a flow cache table including a plurality of entries; and
   configurable hardware logic coupled to the first memory and a processor, the configurable hardware logic comprising a valid split table including a plurality of entries, wherein each of the plurality of entries includes a validity bit and the configurable hardware logic is configured to implement:
      periodically determining whether the validity bit of each of the entries of the valid split table is set; and
      retrieving one of the plurality of entries of the flow cache table corresponding to an index value associated with one of the plurality of entries of the valid split table, when it is determined that the validity bit of the one of the plurality of entries of the valid split table is set.

2. The network traffic management apparatus of claim 1 wherein the configurable hardware logic is further configured to implement:
   obtaining a plurality of entries from a full flow table stored in a second memory coupled to the processor;
   inserting the plurality of entries of the full flow table into the plurality of entries of the flow cache table; and
   setting a validity bit in each of a plurality of the valid split table entries corresponding to each of the plurality of inserted entries of the flow cache table.

3. The network traffic management apparatus of claim 1 wherein each of the plurality of entries of the flow cache table includes an eviction value and the configurable hardware logic is further configured to implement:
   determining whether the retrieved one of the plurality of entries of the flow cache table is marked for eviction based on the eviction value included in the retrieved one of the plurality of entries of the flow cache table;
   sending the retrieved one of the plurality of entries of the flow cache table to a full flow table stored in a second memory coupled to the processor and resetting the validity bit of a corresponding one of the plurality of entries of the valid split table, when it is determined that the retrieved one of the plurality of entries of the flow cache table is marked for eviction.

4. The network traffic management apparatus of claim 1 wherein each of the plurality of entries of the flow cache table includes an age value and the configurable hardware logic is further configured to implement:

determining whether the age value of the retrieved one of the plurality of entries of the flow cache table exceeds a threshold terminal age value;

sending information regarding the retrieved one of the plurality of entries of the flow cache table to a full flow table stored in a second memory coupled to the processor and resetting the validity bit of a corresponding one of the plurality of entries of the valid split table, when it is determined that the age value of the retrieved one of the plurality of entries of the flow cache table exceeds the threshold terminal age value; and incrementing the age value of the retrieved one of the plurality of entries of the flow cache table, when it is determined that the age value of the retrieved one of the plurality of entries of the flow cache table does not exceed the threshold terminal age value.

5. The network traffic management apparatus of claim 1 wherein the first memory is coupled to the configurable hardware logic by a random access memory (RAM) interface bus and wherein the first memory is static random access memory (SRAM).

6. A network traffic management apparatus, comprising:

a first memory comprising a flow cache table including a plurality of entries, each of the plurality of entries including a flow specification and transformation data; and configurable hardware logic coupled to the first memory and a processor, the configurable hardware logic comprising a valid split table including a plurality of entries, wherein each of the plurality of entries of the valid split table includes a validity bit and the configurable hardware logic is configured to implement:

obtaining a network packet having an associated flow specification;

generating an index value based at least in part on at least a portion of the flow specification associated with the obtained network packet;

determining whether the validity bit of one of the plurality of entries of the valid split table corresponding to the index value is set;

retrieving one of the plurality of entries of the flow cache table corresponding to the index value, when it is determined that the validity bit of the one of the plurality of entries of the valid split table corresponding to the index value is set;

determining whether the flow specification associated with the obtained network packet matches the flow specification of the retrieved one of the plurality of entries of the flow cache table;

transforming the network packet based on the transformation data of the retrieved one of the plurality of entries of the flow cache table, when it is determined that the flow specification associated with the obtained network packet matches the flow specification of the retrieved one of the plurality of entries of the flow cache table; and communicating the transformed network packet to an external network device.

7. The network traffic management apparatus of claim 6 wherein each of the plurality of entries of the flow cache table further includes an eviction value and the configurable hardware logic is further configured to implement:

determining whether the retrieved one of the plurality of entries of the flow cache table is not marked for eviction based on the eviction value included in the retrieved one of the plurality of entries of the flow cache table; and only determining whether the flow specification associated with the obtained network packet matches the flow specification of the retrieved one of the plurality of entries of the flow cache table when it is determined that the retrieved one of the plurality of entries of the flow cache table is not marked for eviction.

8. The network traffic management apparatus of claim 7 further comprising:

a second memory comprising a full flow table including a plurality of entries each including a flow specification and transformation data; and a third memory coupled to the processor, wherein the processor is configured to execute programmed instructions stored in the third memory comprising, when it is determined that the validity bit of one of the plurality of entries of the valid split table corresponding to the index value is not set, the retrieved one of the plurality of entries of the flow cache table is marked for eviction, or the flow specification associated with the obtained network packet does not match the flow specification of the retrieved one of the plurality of entries of the flow cache table:

retrieving one of the plurality of entries of the full flow table corresponding to the index value; and transforming the network packet based on the transformation data of the retrieved one of the plurality of entries of the full flow table.

9. The network traffic management apparatus of claim 6 wherein the configurable hardware logic is further configured to implement:

obtaining a plurality of entries from a full flow table stored in a second memory coupled to the processor;

inserting the plurality of full flow table entries into the plurality of entries of the flow cache table; and setting a validity bit in each of a plurality of entries of the valid split table corresponding to one of the plurality of entries inserted in the flow cache table.

10. The network traffic management apparatus of claim 6 wherein the configurable hardware logic is further configured to implement:

marking a subset of the plurality of entries of the flow cache table for eviction;

periodically identifying each of the subset of the plurality of entries of the flow cache table marked for eviction;

sending the identified subset of the plurality of entries of the flow cache table to a full flow table stored in a second memory coupled to the processor; and resetting the validity bit of each of the plurality of entries of the valid split table corresponding to one of the identified subset of the plurality of entries of the flow cache table.

11. The network traffic management apparatus of claim 6 wherein the first memory is coupled to the configurable hardware logic by a random access memory (RAM) interface bus and wherein the first memory is static random access memory (SRAM).

12. A network traffic management apparatus, comprising:

a first memory comprising a flow cache table including a plurality of entries; and configurable hardware logic coupled to the first memory and a processor and comprising a recently hit split table including a plurality of entries, wherein each of the plurality of entries of the recently hit split table includes a recently hit bit and the configurable hardware logic is configured to implement:

periodically determining whether the recently hit bit of each of the plurality of entries of the recently hit split table is set; and retrieving one of the plurality of entries of the flow cache table corresponding to an index value associated with one of the plurality of entries of the recently hit split table, when it is determined that the recently hit bit of the one of the plurality of entries of the recently hit split table is not set.

13. The network traffic management apparatus of claim 12 wherein the configurable hardware logic is further configured to implement:
obtaining a plurality of network packets each having an associated flow specification;
generating an index value for each of the plurality of network packets based at least in part on a respective one of the associated flow specifications; and
setting a recently hit bit of a subset of the plurality of entries of the recently hit split table, wherein each of the subset of the plurality of entries of the recently hit split table corresponds to one of the index values.

14. The network traffic management apparatus of claim 12 wherein the configurable hardware logic is further configured to implement resetting the recently hit bit of the one of the plurality of entries of the recently hit split table, when it is determined that the recently hit bit of the one of the plurality of entries of the recently hit split table is set.

15. The network traffic management apparatus of claim 12 wherein each of the plurality of entries of the flow cache table includes an eviction value and the configurable hardware logic is further configured to implement:
determining whether the retrieved one of the plurality of entries of the flow cache table is marked for eviction based on the eviction value included in the one of the plurality of entries of the flow cache table entry; and
sending the retrieved one of the plurality of entries of the flow cache table to a full flow table stored in a second memory coupled to the a processor, when it is determined that the retrieved one of the plurality of entries of the flow cache table is marked for eviction.

16. The network traffic management apparatus of claim 12 wherein each of the plurality of entries of the flow cache table includes an age value and the configurable hardware logic is further configured to implement:
determining whether the age value of the retrieved one of the plurality of entries of the flow cache table exceeds a threshold terminal age value;
sending information regarding the retrieved one of the plurality of entries of the flow cache table to a full flow table stored in a second memory coupled to the processor, when it is determined that the age value of the retrieved one of the plurality of entries of the flow cache table exceeds the threshold terminal age value; and
incrementing the age value of the retrieved one of the plurality of entries of the flow cache table, when it is determined that the age value of the retrieved one of the plurality of entries of the flow cache table does not exceed the threshold terminal age value.

17. The network traffic management apparatus of claim 12 wherein the first memory is coupled to the configurable hardware logic by a random access memory (RAM) interface bus and wherein the memory is static random access memory (SRAM).

* * * * *